US010425550B2

(12) United States Patent
Hasegawa et al.

(10) Patent No.: US 10,425,550 B2
(45) Date of Patent: Sep. 24, 2019

(54) OPTICAL SCANNING DEVICE WITH DUCT FOR HEAT DISSIPATION, AND IMAGE FORMING DEVICE HAVING THE SAME

(71) Applicant: Konica Minolta, Inc., Chiyoda-ku, Tokyo (JP)

(72) Inventors: Ryo Hasegawa, Hachioji (JP); Hajime Taniguchi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/878,170

(22) Filed: Jan. 23, 2018

(65) Prior Publication Data
US 2018/0227456 A1 Aug. 9, 2018

(30) Foreign Application Priority Data

Feb. 7, 2017 (JP) .................................. 2017-020678

(51) Int. Cl.
| *H04N 1/028* | (2006.01) |
| *G03G 15/20* | (2006.01) |
| *G03G 15/16* | (2006.01) |
| *G03G 15/02* | (2006.01) |
| *G02B 27/09* | (2006.01) |
| *G03G 15/04* | (2006.01) |
| *G03G 15/043* | (2006.01) |
| *G03G 21/20* | (2006.01) |

(52) U.S. Cl.
CPC ....... *H04N 1/0283* (2013.01); *G02B 27/0977* (2013.01); *G03G 15/0216* (2013.01); *G03G 15/04036* (2013.01); *G03G 15/1615* (2013.01); *G03G 15/2039* (2013.01); *G03G 15/0435* (2013.01); *G03G 21/206* (2013.01)

(58) Field of Classification Search
None
See application file for complete search history.

(56) References Cited

U.S. PATENT DOCUMENTS

| 2003/0226958 A1* | 12/2003 | Ohno | ................... G02B 26/121 |
| | | | 250/234 |
| 2010/0091083 A1* | 4/2010 | Itami | ....................... B41J 2/471 |
| | | | 347/261 |

FOREIGN PATENT DOCUMENTS

| JP | 2004-012859 | 1/2004 |
| JP | 2005-024894 | 1/2005 |
| JP | 2010-113329 | 5/2010 |

\* cited by examiner

*Primary Examiner* — Andrew H Lam
(74) *Attorney, Agent, or Firm* — Squire Patton Boggs (US) LLP

(57) ABSTRACT

An optical scanning device has a housing in which a duct surrounds a space from the deflector and its circumference to an outlet in insulation from the optical system, and guides gas from an inlet to the space. A positioning member is shaped as a pillar that protrudes from the floor of the duct towards the deflector and has a tip to contact with the deflector to locate the rotation axis of the polygon mirror at a position relative to the housing. The positioning member further limits a clearance between an outer surface of the deflector and the floor to secure therein a flow path of the gas.

21 Claims, 9 Drawing Sheets

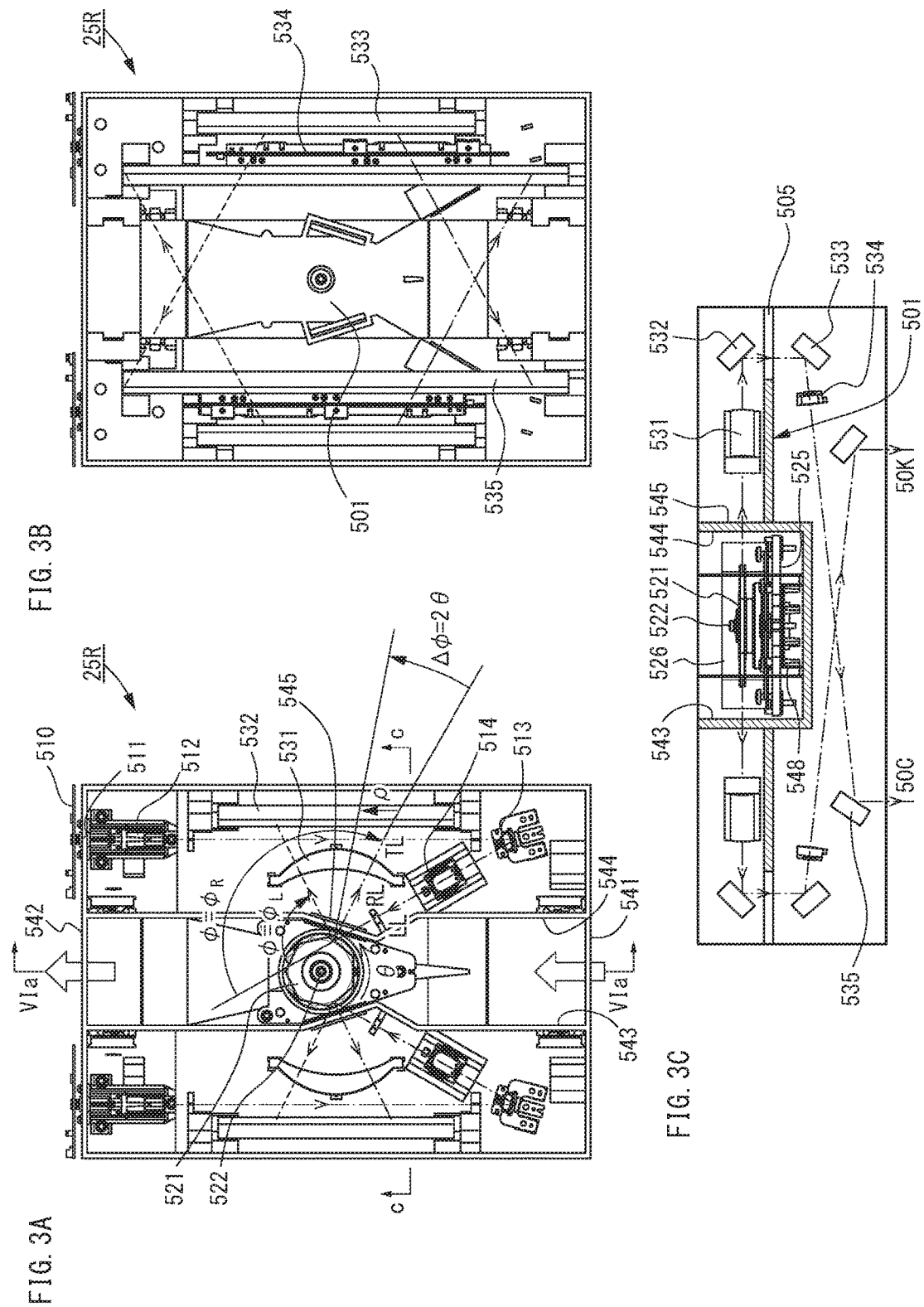

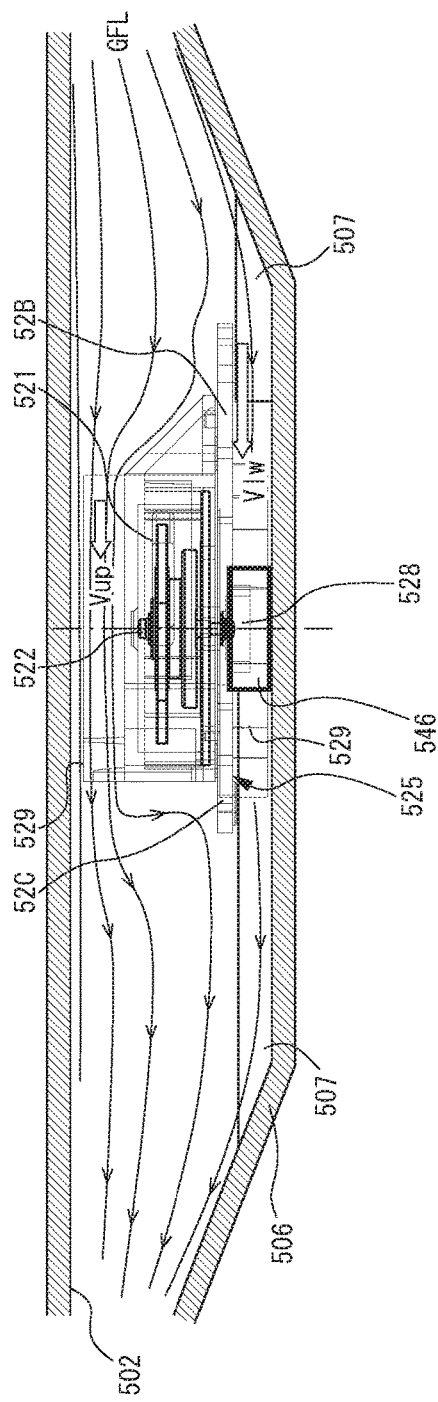

OPTICAL SCANNING DEVICE WITH DUCT FOR HEAT DISSIPATION, AND IMAGE FORMING DEVICE HAVING THE SAME

This application claims priority to Japanese Patent Application No. 2017-20678, filed Feb. 7, 2017, the contents of which are hereby incorporated by reference in their entirety.

BACKGROUND

1. Technical Field

The invention relates to electrophotographic image forming devices, and in particular, a heat dissipation structure of an optical scanning device for exposure and scanning of a photoreceptor.

2. Related Art

Optical scanning devices, which are also called "print heads," are used in electrophotographic image forming devices, such as printers and copiers, for exposure of photoreceptor surfaces. Concretely, optical scanning devices each include a light source, a deflector, and an optical system. The light source irradiates the deflector with a light beam modulated by image data. The deflector rotates a built-in polygon mirror with a motor, which is hereinafter referred to as a "polygon motor," and reflects the modulated beam by facets of the polygon mirror in turn, thus changing a deflected angle of the modulated beam periodically. The optical system focuses the deflected beam on a uniformly charged area of the photoreceptor surface. Caused by change in deflected angle, the beam spot travels on the photoreceptor surface in a direction, and thus, the surface is linearly exposed. In the linearly exposed area, according to change in exposure amount, a charge distribution forms a pattern corresponding to the image data, i.e. a line of an electrostatic latent image. The photoreceptor covers the outer circumferential surface of a rotator, such as a drum and a belt, and rotates along with the rotator during the exposure. In synchronization with the rotation of the photoreceptor, the optical scanning device repeats exposure of a line. This results in a plurality of exposed lines lying in the rotating direction on the photoreceptor surface, and thus, the electrostatic latent image extends two-dimensionally.

In a typical optical scanning device, a housing contains the polygon mirror, the polygon motor, and the optical system, thereby protecting optical elements from dust in the external air. In addition, the same housing allows all the optical elements to be fixed thereon, and thus, maintains a high accuracy of positioning of the optical elements. On the other hand, the housing tends to prevent heat dissipated by the polygon motor and its driver circuit from escaping to the outside. If the housing is overheated and thus excessively distorted, relative displacement between the optical elements has a high risk of becoming too large. If one or more of the optical elements are overheated and thus excessively deformed, change of their optical characteristics has a high risk of becoming too large. In either case, the location of an exposed area of the photoreceptor surface or the amount of exposure is subject to excessive error, which prevents image quality from being improved. In order to avoid this, it is important that the housing allows effective heat release from its inside.

An existing technology for heat dissipation is known, which is a structure insulating from the housing a path of escaping heat from the polygon mirror, i.e. a duct. For example, a structure disclosed in JP 2004-012859 includes the duct extending directly below the bottom surface of the deflector, more precisely, directly below the outer surface of a portion of the body of the deflector, and the inner surface of the portion faces the polygon motor. Each structure disclosed in JP 2005-024894 and JP 2010-113329 includes the duct in which the deflector is suspended in the air. In any of the structures, the duct allows air flows to carry heat from the motor to the outside of the housing, thus preventing the heat from invading the inside of the housing. In other words, the duct thermally insulates the optical system from the deflector.

SUMMARY

For the purpose of further improvement in productivity and image quality of image forming apparatuses, recent optical scanning devices require an idea for an increase in area scanned per unit time, i.e. data amount written per unit time. As such an idea, an increase in rotation speed of polygon mirrors is known, for example, but the increase in rotation speed entails an increase in heat amount from polygon motors and their driver circuits, and thus, has a risk of being impermissible for existing heat dissipation structures. For example, a structure such as one disclosed in JP 2004-012859 that merely cools the bottom surface of the deflector has insufficient heat dissipation capacity. A structure such as one disclosed in JP 2005-024894 that holds the deflector by a member different from the housing has a high risk of excessive dislocation of the polygon mirror caused by difference in thermal distortion between the member and the housing. This structure also has an inevitable risk of an excessive inclination of the rotation axis of the polygon mirror, i.e. a virtual line indicating the center of rotation of the polygon mirror, and thus, hardly achieves more accurate positioning of the polygon mirror. A structure such as one disclosed in JP 2010-113329 that forces cooling gas flows directly onto the polygon mirror hardly limits to an acceptable range wobbling of its rotation axis or fluctuation of its rotation speed caused by turbulence of the gas flows. In addition, a supporting face where the polygon mirror is to be fixed needs a gas outlet since the gas flows in the axial direction of the polygon mirror. This probably results in an insufficient strength of the supporting face to ensure a necessary positioning accuracy, or an insufficient area of the gas outlet to ensure a necessary heat dissipation efficiency.

An object of the invention is to solve the above-mentioned problems, and in particular, to provide an optical scanning device capable of both maintaining a high accuracy of positioning the rotation axis of the polygon mirror and releasing heat from the polygon motor and its driver circuit to the outside at a high efficiency, regardless of increasing rotation speed of the polygon mirror.

An optical scanning device according to one aspect of the invention is a device for scanning a target surface with light. This device includes a light source, a deflector, an optical system, and a housing. The deflector includes a polygon mirror that, while rotating, reflects a beam from the light source to deflect the beam, a motor rotating the polygon mirror, and a body containing the polygon mirror and the motor, the body including a supporting section supporting the motor. The optical system focuses a beam reflected from the polygon mirror on the target surface. The housing contains the light source, the deflector, and the optical system, including an inlet allowing external air to enter the housing, an outlet allowing internal air to flow out of the housing, and a duct surrounding a space from the deflector and its circumference to the outlet in insulation from the optical system, and guiding gas from the inlet to the space. The duct has a floor facing to an outer surface of the supporting section of the body of the deflector, and a positioning member shaped as a pillar that protrudes from the floor towards the deflector and has a tip to contact with the deflector to locate the rotation axis of the polygon mirror at a position relative to the housing, and to limit a clearance between the supporting section and the floor to secure therein a flow path of the gas from the inlet.

An image forming apparatus according to one aspect of the invention includes an imaging unit forming a toner image on a sheet, and a fuser unit thermally fixing the toner image. The imaging unit includes a photoreceptor varying an amount of charge with an amount of exposure, the above-mentioned optical scanning device exposing the photoreceptor to a light beam and forming an electrostatic latent image on the photoreceptor, a developer converting the latent image to a visible image with toner, and a transfer device transferring the visible image converted by the developer from the photoreceptor to a sheet.

BRIEF DESCRIPTION OF THE DRAWINGS

The advantages and features provided by one or more embodiments of the invention will become more fully understood from the following description taken in conjunction with the accompanying drawings which are given by way of illustration only, and thus are not intended as a definition of the limits of the invention. In the drawings:

FIGS. 3A and 3B are, respectively, top and bottom views of the internal configuration of the optical scanning device in FIGS. 2A, 2B; FIG. 3C is a vertical cross-sectional view of the optical scanning device along the line c-c shown in FIG. 3A;

FIGS. 6A and 6B are vertical and horizontal cross-sectional views of the center portion along the lines VIa-VIa and c-c in FIG. 3A, respectively;

DETAILED DESCRIPTION

The following is a description of embodiments of the invention with reference to the drawings.

Appearance of Image Forming Apparatus

Figure 1A:
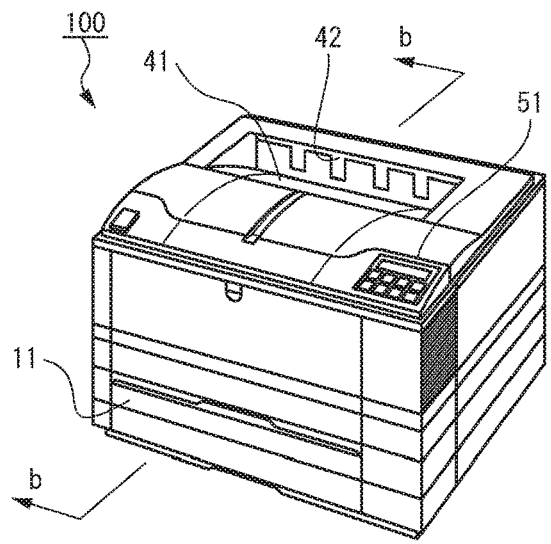
FIG. 1A is a perspective view of the appearance of a printer according to an embodiment of the invention.

FIG. 1A is a perspective view of the appearance of an image forming apparatus 100 according to an embodiment of the invention. This image forming apparatus 100 is a printer, which has, on the top of its body, an ejection tray 41 that stores sheets ejected from an ejection slot 42 located deep in the tray. The printer 100 also has, in front of the ejection tray 41, an operation panel 51 embedded, and in the bottom of its body, paper cassettes 11 attached to be able to slide out like drawers.

Internal Configuration of Printer

Figure 1C:
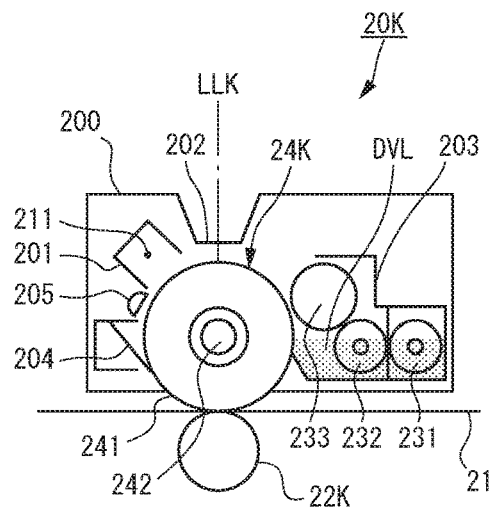
FIG. 1C is an enlarged view of one of the photoreceptor units shown in FIG. 1B.
Figure 1B:
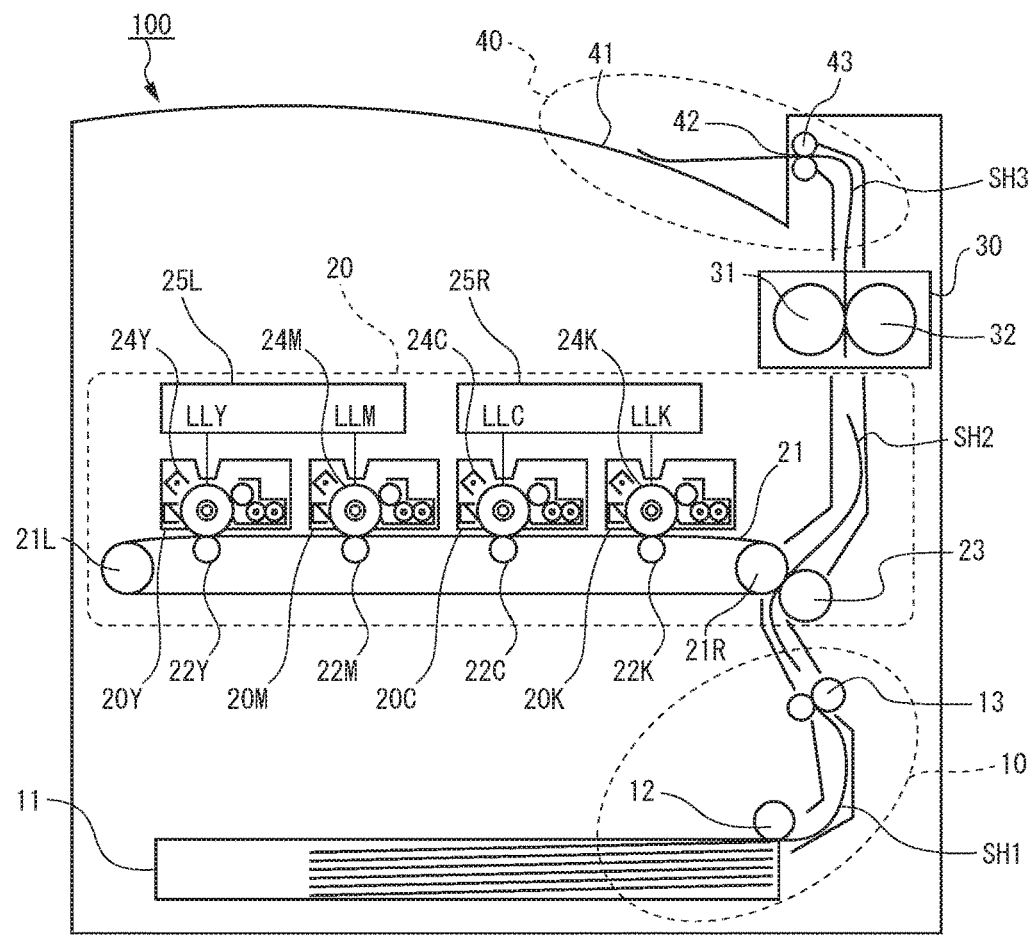
FIG. 1B is a schematic cross-sectional view of the printer along the line b-b shown in FIG. 1A.

FIG. 1B is a schematic cross-sectional view of the printer 100 along the line b-b shown in FIG. 1A. The printer 100, which is an electrophotographic type capable of color printing, includes a feeder device 10, an imaging device 20, a fuser device 30, and an ejecting device 40.

The feeder device 10 first, with a pickup roller 12, separate each sheet SH1 from a stack of sheets SHT stored in a paper cassette 11, and next, with a timing roller 13, feeds each separated sheet to the imaging device 20. The term "sheets" means film-, or thin-plane-shaped materials, products, or print pieces made of paper or resin. Paper types, i.e. types of sheets storable in the paper cassette 11 include plain, high-quality, color-copier, coated, etc.; and sizes of the sheets include A3, A4, A5, B4, etc. The sheets can be stored in the longitudinal or transverse position.

The imaging device 20 is, for example, a printing engine of intermediate transfer type, which includes four tandem photoreceptor units 20Y, 20M, 20C, 20K, an intermediate transfer belt 21, four primary transfer rollers 22Y, 22M, 22C, 22K, a secondary transfer roller 23, and two optical scanning devices 25L, 25R. The intermediate transfer belt 21 rotatably wraps around a driven pulley 21L and a driving pulley 21R. In a space between these pulleys 21L, 21R, the four photoreceptor units 20Y-20K and the four primary transfer rollers 22Y-22K are arranged such that each of the photoreceptor units is paired with one of the primary transfer rollers with the intermediate transfer belt 21 in between. The secondary transfer roller 23, along with the driving pulley 21R, forms a nip with the intermediate transfer belt 21 in between. Into this nip, a sheet SH2 is sent by the timing roller 13. In the photoreceptor units 20Y-20K, the photoreceptor drums 24Y, 24M, 24C, 24K, the intermediate transfer belt 21, the driven pulley 21L, the driving pulley 21R, the primary transfer rollers 22Y-22K, and the secondary transfer roller 23 have rotation axes parallel to each other. The common axial direction, the direction normal to the page of FIG. 1B, is hereinafter referred to as a "main scanning direction." The optical scanning devices 25L, 25R, for example, each emit laser beams modulated by image data to two of the photoreceptor units 20Y-20K.

In the photoreceptor units 20Y-20K, their respective photoreceptor drums 24Y-24K, along with the primary transfer rollers 22Y-22K facing the drums across the intermediate transfer belt 21, form nips with the belt in between. During rotation of intermediate transfer belt 21, counterclockwise rotation in FIG. 1B, the photoreceptor units 20Y-20K, when accepting the same surface portion of the intermediate transfer belt 21 passing through the nips between their respective photoreceptor drums 24Y-24K and the primary transfer rollers 22Y-22K, form on the same surface portion of the belt monochromatic toner images of their respective colors, i.e., yellow (Y), magenta (M), cyan (C), and black (K). These four monochromatic toner images then overlap onto the same surface position of the belt and form a single polychromatic toner image. At the same time when this polychromatic toner image passes through the nip between the driving roller 23R and the secondary transfer roller 23, a sheet SH2 is sent from the timing roller 13 to the nip. At the nip, the polychromatic toner image is transferred from the intermediate transfer belt 21 onto the sheet SH2.

The fuser device 30 thermally fixes a toner image to the sheet SH3 conveyed from the imaging device 20. More specifically, the fuser device 30 makes a fuser roller 31 and a pressure roller 32 rotate, and sends the sheet SH3 to the nip therebetween. Then, the fuser roller 31 applies heat to the surface of the sheet SH3, and the pressure roller 32 applies pressure to the same surface of the sheet SH3 to press the surface against the fuser roller 31. Due to the heat from the fuser roller 31 and the pressure from the pressure roller 32, the toner image is fixed onto the surface of the sheet SH3. The fuser device 30 further conveys the sheet SH3 to the ejecting device 40 by the rotation of the fuser roller 31 and pressure roller 32.

The ejecting device 40 ejects the sheet SH3 with a toner image fixed from the ejection slot 42 to the ejection tray 41. More specifically, the ejecting device 40 uses ejecting rollers 43, which are disposed inside of the ejection slot 42, to eject the sheet SH3 coming from the top portion of the fuser device 30 to the ejection slot 42 and store it on the ejection tray 41.

Configuration of Photoreceptor Unit and Image Forming Process by the Unit

FIG. 1C is an enlarged view of one 20K of the photoreceptor units shown in FIG. 1B. This photoreceptor unit 20K includes a charger section 201, exposure section 202, developer section 203, cleaning blade 204, and eraser 205, in addition to the photoreceptor drum 24K. These functional sections 201-205, along with the photoreceptor drum 24K, are contained in the housing 200 of the photoreceptor unit 20K, and the sections are arranged around the photoreceptor drum 24K. The functional sections 201-205 perform an electrophotographic image forming process for the outer circumferential surface 241 of the photoreceptor drum 24K except for fusing, i.e. charging, exposing, developing, transferring, cleaning, and neutralizing. Other photoreceptor units 20Y, 20M, 20C also have the same configuration.

The photoreceptor drum 24K is a drum-shaped member made of an electric conductor, such as aluminum, with the outer circumferential surface 241 covered with photoreceptor. The photoreceptor drum 24K is supported rotatably around its center axis 242, the axis penetrating the page of FIG. 1C in its normal direction at the center of the circular cross section of the photoreceptor drum 24K. The photoreceptor is a material varying charge amounts depending on exposures, for example, inorganic material such as amorphous selenium, selenium alloy, and amorphous silicon, or laminated structure of organic photoconductors (OPCs). Although not shown in FIG. 1C, the center axis 242 of the photoreceptor drum 24K is connected to a driving motor through torque transmission mechanism such as gears and belts. When receiving torque from the motor, the photoreceptor drum 24K rotates one revolution, clockwise in FIG. 1C, and then surface portions of the photoreceptor in turn face the surrounding functional sections 201-205 and are processed by them.

The charger section 201 includes an electrode 211 shaped as a wire or a thin plate, which is located at a distance from the outer circumferential surface 241 of the photoreceptor drum 24K and extends in the axial direction of the drum, the direction normal to the page of FIG. 1C. The charger section 201 applies to the electrode 211, for example, a negative high voltage to cause corona discharge between the electrode 211 and the outer circumferential surface 241 of the photoreceptor drum 24K. This discharge provides negative charges to the surface portion of the photoreceptor facing the charging section 201.

The exposure section 202 is an opening in a portion of the housing 200 of the photoreceptor unit 20K; the portion is located at the gap between the charger section 201 and the developer section 203. Through the exposure section 202, a portion of the outer circumferential surface 241 of the photoreceptor drum 24K is exposed on the outside of the housing 200 immediately after the portion is charged by the charger section 201, and then irradiated with a laser beam from the optical scanning device 25R.

The optical scanning devices 25L, 25R each irradiate a different one of the photoreceptor units 20Y-20K with a laser beam modulated according to image data on brightness of a different color of Y, M, C, and K. More concretely, one 25L of the two optical scanning devices in FIG. 1B irradiates two photoreceptor units 20Y and 20M with laser beams LLY and LLM modulated according to image data on brightness of Y and M, respectively; the other 25R irradiates the other two photoreceptor units 20C and 20K with laser beams LLC and LLK modulated according to image data on brightness of C and K, respectively. In the photoreceptor unit 20K, the portion of the outer circumferential surface 241 of the photoreceptor drum 24K, which is exposed through the exposure section 202, is scanned in the axial direction of the drum 24K, i.e. the main scanning direction, by the laser beam LLK modulated according to image data on brightness of K. Since a more intense laser beam reduces a larger number of charges on the photoreceptor, a linear exposed area extending in the main scanning direction is provided with a charge distribution corresponding to variation in intensity of the laser beam, i.e. one line of an electrostatic latent image represented by a distribution in brightness of K. Such an exposure action for one line is repeated by each of the optical scanning devices 25L, 25R in synchronization with the rotation of the photoreceptor drums 24Y-24K. This results in a plurality of exposed lines lying on the outer circumferential surface 241 of each of the photoreceptor drums 24Y-24K in the rotating direction, which is hereinafter referred to as a "sub-scanning direction," and thus, the electrostatic latent image extends two-dimensionally.

The developer section 203 develops the electrostatic image on the photoreceptor drum 24K with K-colored toner. More concretely, the section 203 first agitates dual-component developer DVL and causes friction to provide negative charges to toner contained in the developer DVL. The section 203 next uses a developer roller 233 to carry the developer DVL to the nip between the roller 233 and the drum 24K. In parallel, the section 203 applies negative high voltage to the roller 233 to raise the electric potential of areas with a relatively small number of charges in the electrostatic latent image. From the toner carried by the roller 233, an amount of toner corresponding to a reduced number of the charges is separated and migrates to the areas. Then, the electrostatic latent image is converted to a visible toner image.

The rotation of the photoreceptor drum 24K moves the toner image to the nip between the drum 24K and the primary transfer roller 22K. Since positive high voltage is applied to the roller 22K, the negatively charged toner image is transferred from the outer circumferential surface of the drum 24K to the intermediate transfer belt 21.

The cleaning blade 204 is a thin rectangular plate made of, for example, thermosetting resin such as polyurethane. The blade 204 has nearly the same length as an area covered with the photoreceptor on the outer circumferential surface 241 of the photoreceptor drum 24K. A side of the blade 204 that faces the outer circumferential surface 241 of the drum 24K has a longer edge parallel to the axial direction of the drum 24K and in contact with the surface 241, thus using the edge to remove residual toner from the trace of a toner image. As a result, the blade 204 cleans the surface 241 of the drum 24K.

The eraser 205 has light emission diodes (LEDs) aligned in the axial direction of the photoreceptor drum 24K, and from them, emits light to the outer circumferential surface 241 of the drum 24K. Since areas of the surface 241 receiving the light lose residual charges, the eraser 205 removes changes from the surface 241.

Configuration of Optical Scanning Device

Figure 2A:
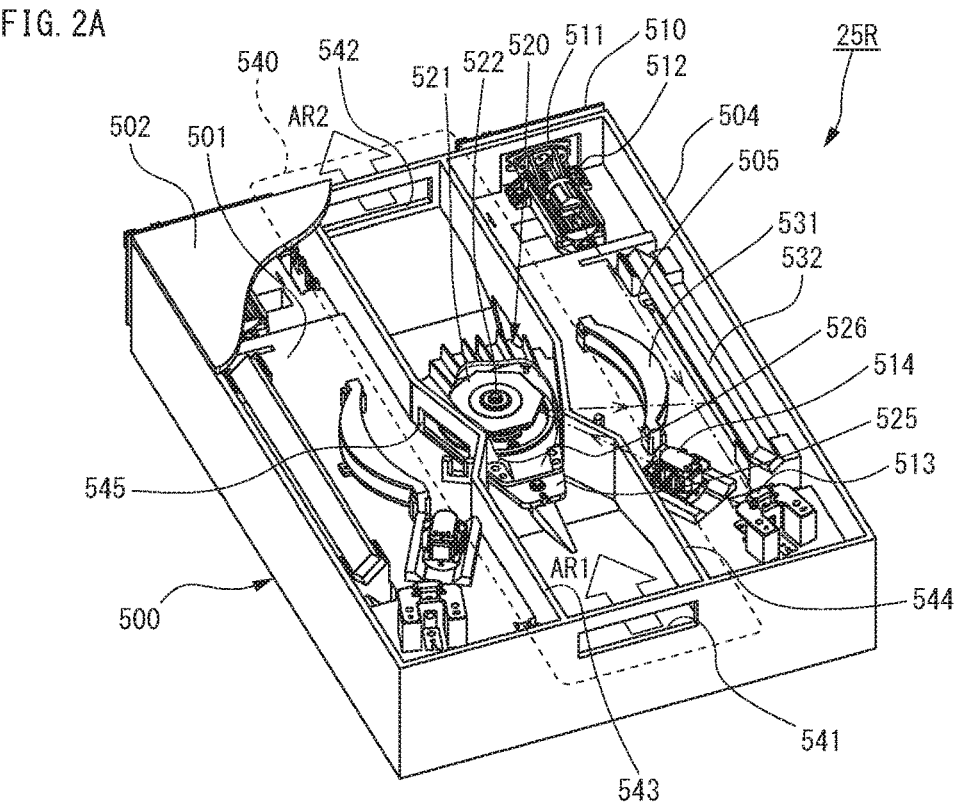
FIGS. 2A and 2B are perspective views of appearances of the optical scanning device in FIG. 1B visible from different viewpoints.
Figure 2B:
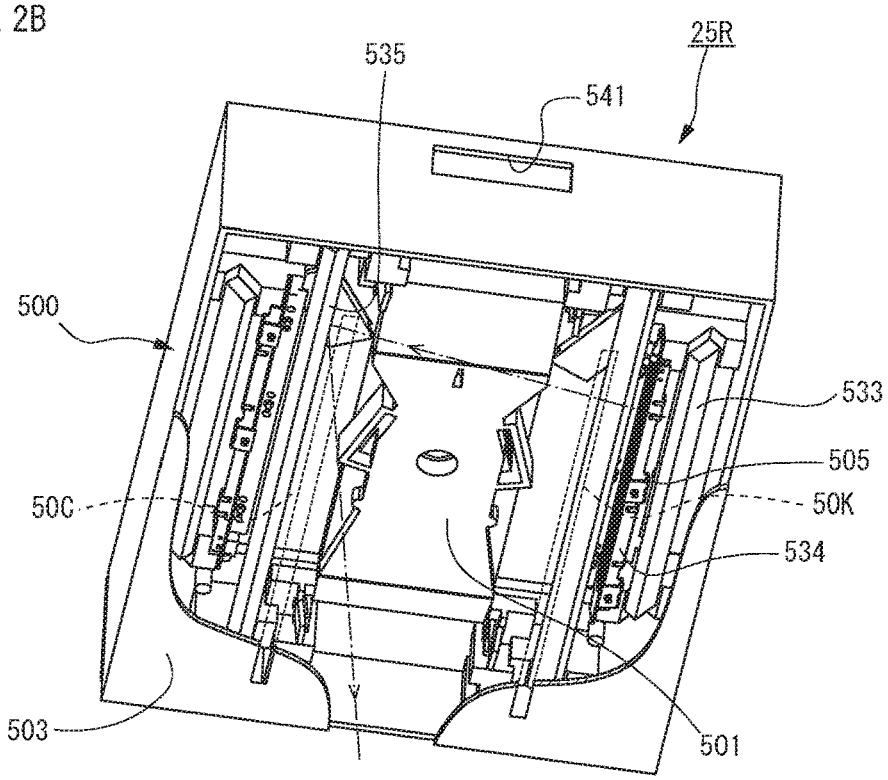

FIGS. 2A and 2B are perspective views of appearances of the optical scanning device 25R visible from different viewpoints. In FIG. 2A, the top surface 502 of the housing 500, which is the body of the optical scanning device 25R, can be seen; In FIG. 2B, the bottom surface 503 of the housing 500 can be seen. For the purpose of illustration of the internal configuration of the optical scanning device 25R, the top surface 502 and bottom surface 503 are each removed except for a portion at a corner. FIGS. 3A, 3B are, respectively, the top, bottom views of the internal configuration of the optical scanning device 25R; FIG. 3C is a vertical cross-sectional view of the optical scanning device 25R along the line c-c shown in FIG. 3A. As shown in FIGS. 2A, 2B, 3A-3C, the optical scanning device 25R includes light sources 510, an emission optical system 512, 513, 514, a deflector 520, and a scanning optical system 531, 532, 533, 534, 535, which are contained in the housing 500. These elements and their arrangement are the same as those in the other optical scanning device 25L.

The housing 500 is a housing shaped as a cuboid, for example, which is supported by the chassis of the printer 100 (not shown in figures) such that its longest edges are parallel to the common axis direction of the photoreceptor drums 24Y-24K, i.e. the main scanning direction. See FIG. 1B. The housing 500 includes a base plane 501, top cover 502, and bottom cover 503. These members 501, 502, 503 are each shaped as a rectangular board of substantially the same size. In particular, the base plate 501 is a metal product such as die-cast aluminum, or an object molded from hard resin such as fiber-reinforced plastic (FRP), thus having a high rigidity. The base plate 501 supports the light sources 510, emission optical system 512-514, deflector 520, and scanning optical system 531-535 on both the board surfaces, and determines their optical positions. The base plate 501 further includes side walls 504, which extend from the edges of both the board surfaces in the directions normal to the board surfaces. The top cover 502 is put above the space surrounded by the upper board surface of the base plate 501 (its top surface in FIG. 2A) and the side walls 504, thus insulating the space from the outside. The bottom cover 503 is put below the space surrounded by the lower board surface of the base plate 501 (its bottom surface in FIG. 2B) and the side walls 504, thus insulating the space from the outside. Hence, the inner spaces of the housing 500 enclosed by the two covers 502, 503, and side walls 504 are partitioned by the base plate 501 into two volumes, which are located one above the other in FIGS. 2A, 2B, and 3C. These volumes are hereinafter also referred to as "upper and lower stages."

The upper stage includes an air inlet 541, air outlet 542, and two partition walls 543, 544. The air inlet 541 is a through hole opened in one of the side walls of the base plate 501, for example, in FIG. 2A, the side wall extending from one of the shorter edges of the board surface; the air inlet 541 allows external air to enter the inside of the upper stage. See an arrow AR1 in FIG. 2A. The air outlet 542 is a through hole opened in another of the side walls of the base plate 501, for example, in FIG. 2A, the side wall extending from the other of the shorter edges of the board surface; the air outlet 542 allows internal air of the upper stage to flow out to the outside. See an arrow AR2 in FIG. 2A. The air inlet 541 and outlet 542 are located at the centers of the side walls along the shorter edges of the base plate 501 in FIG. 2A. The partition walls 543, 544 are wall surfaces extending in the upper stage in the direction of the longer edges of the base plate 501; the partition walls 543, 544 are located at either side of the space from the air inlet 541 to outlet 542, thus insulating the space from other spaces in the upper stage. In this manner, the partition walls 543, 544, along with the base plate 501 and the top cover 502, forms a duct 540 connecting between the air inlet 541 and outlet 542. In FIG. 2A, the duct 540 is located at the center of the upper stage in the direction of the shorter edges of the base plate 501.

Although not shown in FIGS. 2A and 2B, a fan or the outlet of a duct is installed at the outside of the air inlet 541; the duct leading an air flow from a fan remotely disposed. Air flows from these fans enter the air inlet 541 of the housing 500 to the duct 540, which guides the air flows in the space from the inlet 541 to the outlet 542. Since the duct 540 insulates the space from the other spaces in the upper stage, the air flows travel through the duct 540 without leaking to the other spaces, especially without touching any of the optical elements 512-514, 531-535, and then, escapes through the air outlet 542 to the outside of the housing 500.

—Light Source—

The light sources 510 are printed-circuit boards installed on the outer surface of one of the side walls of the housing 500, for example, in FIG. 2A and FIG. 3A, the side wall extending from one of the shorter edges of the base plate 501. The light sources 510 are each provided for one of the colors Y, M, C, and K represented by image data. In the optical scanning device 25R in FIG. 2A, two of the light sources 510 for two colors C and K are disposed symmetrically with respect to the center line of the base plate 501 in the direction of the shorter edges of the board surface, esp. the center of the air outlet 542. On each of the light sources 510, a semiconductor laser 511 and its control circuit (not shown in figures) are mounted.

The semiconductor laser 511 includes a laser oscillator such as a laser diode, which can emit a laser beam, for example, with a wavelength of 780 nm or 655 nm and a power of a few mW through a dozen mW. With this laser beam, the semiconductor laser 511 irradiates the inside of the upper stage of the housing 500 through a through hole in the side wall of the housing that the light sources 510 face.

The control circuit is an electronic circuit dedicated for light-emission control of the semiconductor laser 511, for example, based on an application specific integrated circuit (ASIC) or a field programmable gate array (FPGA). The control circuit receives image data from a main controller built in the printer 100, and then modulates blinking pattern of the semiconductor laser 511 with brightness of C or K indicated by the image data. For example, the higher the brightness of C or K for each pixel, the longer the light-emission time of the semiconductor laser 511.

—Emission Optical System—

The emission optical system 512, 513, 514 is a group of optical elements to be exclusively used by one of the light sources 510; the system is disposed outside the duct 540 in the upper stage of the housing 500, and from there, irradiates the deflector 520 with a laser beam emitted from one of the light sources 510. In the optical scanning device 25R in FIG. 2A, two groups of the emission optical systems for two of the light sources 510 are disposed symmetrically with respect to the center plane of the board surface of the base plate 501 in the direction of its shorter edges, esp. the center axis of the duct 540.

The emission optical system includes a collimator lens 512, mirror 513, and cylindrical lens 514. The collimator lens 512 converts a laser beam emitted from the semiconductor laser 511 to a parallel beam. The mirror 513 reflects the laser beam emitted from the collimator lens 512 to the cylindrical lens 514. The cylindrical lens 514 converts the beam reflected by the mirror 513 to a converging beam in a direction normal to the board surface of the base plate 501 and to a parallel beam in a direction parallel to the board surface.

—Deflector—

The deflector 520 is disposed inside the duct 540 in the upper stage of the housing 500, and supported by (in FIG. 2A, the center portion of) the board surface of the base plate 501. The deflector 520 contains a polygon mirror 521 and polygon motor (not shown in FIG. 2A) in its body 525, 526; in FIG. 2A, a portion of its upper shell 526 is removed. By using the polygon mirror and motor, the deflector 520 deflects a laser beam from the cylindrical lens 514 and periodically changes its deflection angle.

Figure 4A:
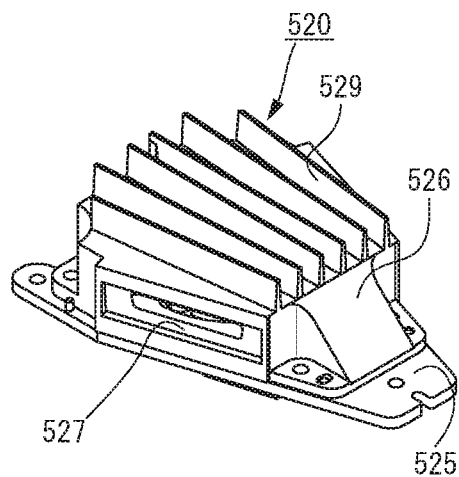
FIGS. 4A and 4C are perspective views of appearances of the deflector in FIGS. 3A-3C visible from different viewpoints.
Figure 4B:
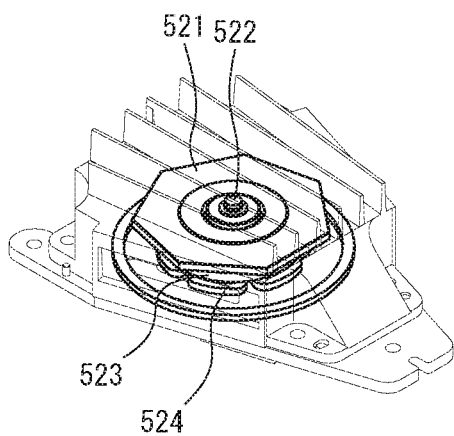
FIGS. 4B and 4D are perspective views of the internal configuration of the deflector visible from the same viewpoints as FIGS. 4A and 4C, respectively.
Figure 4C:
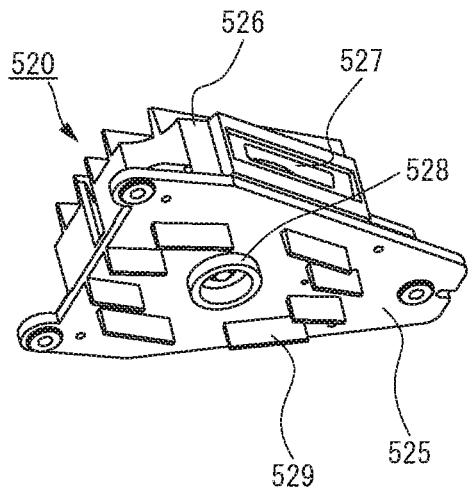
Figure 4D:
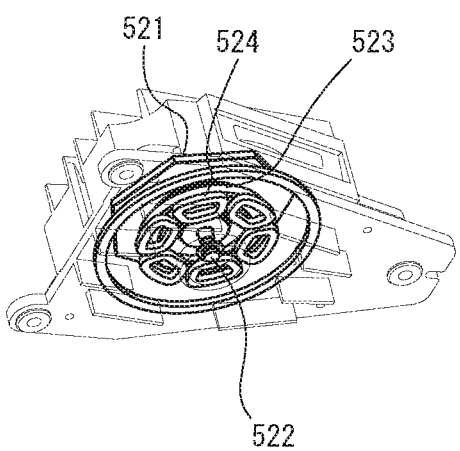

FIGS. 4A and 4C are perspective views of the appearances of the deflector 520 visible from different viewpoints; in FIG. 4A, the top surface of the deflector 520 is seen, and in FIG. 4C, its bottom surface is seen. FIGS. 4B and 4D are perspective views of the internal configuration of the deflector 520 visible from the same viewpoints as FIGS. 4A and 4C, respectively. FIGS. 4B and 4D show the body 525, 526 of the deflector 520 as if it were transparent.

The body of the deflector 520 includes a bottom plate 525 and upper shell 526, which are both made of high-thermal conducting metal or resin such as aluminum. The bottom plate 525 is a substantially trapezoid-shaped plate; as shown in FIGS. 2A and 3A, the bottom plate 525 is, for example, screwed to the base plate 501 such that the upper base of the trapezoid is directed at the air inlet 541 and the lower base thereof is directed at the air outlet 542. The bottom plate 525 includes on its board surface a supporter portion (not shown in figures), which supports the polygon mirror 521, shaft 522, and polygon motor 523, 524. The upper shell 526 is a box with one open side, which is closed with the bottom plate 525. Accordingly, the upper shell 526, along with the bottom plate 525, hermetically encloses the polygon mirror 521, shaft 522, and polygon motor 523, 524 in between, thus insulating them from the outside. The upper shell 526 is provided in its side surfaces with transparent windows 527, which are made of transparent glass or resin, and face similar transparent windows 545 provided to the partition walls 543, 544 of the housing 500. See FIG. 2A.

The polygon mirror 521 is a regular polygonal prism, for example, a regular heptagonal prism in FIGS. 2A to 4D, whose side surfaces are all mirror finished, thus reflecting an incident beam to deflect it. These side surfaces are hereinafter also referred to as "facets." The polygon mirror 521 further includes a bearing at its center portion (not shown in figures).

The shaft 522 is an axis shaped as an elongated column, fixed on the bottom plate 525 in the position normal to the board surface. The shaft 522 penetrates the center portion of the polygon mirror 521 and touches the bearing of the mirror with its own outer circumferential surface. Accordingly, the shaft 522 holds the polygon mirror 521 rotatably therearound, and in particular, forces the rotation axis of the polygon mirror 521, a virtual line indicating the center of the rotation, to locate at the same position as the center axis of the shaft.

The polygon motor is, for example, a brushless direct-current (BLDC) motor, and includes a rotor 523 and stator 524. The rotor 523 is a ring made of permanent magnet such as neodymium, and fixed coaxially to the polygon mirror 521. The stator 524 is a plurality of coils arranged on a concentric circle around the shaft 522 and fixed on the bottom plate 525. These coils 524 receive electric current in turn from a driver circuit mounted on the bottom plate 525 (not shown in figures.) Then, the coils 524 generate a magnetic field distribution periodically changing, which exerts a torque around the shaft 522 to the permanent magnet 523. This torque rotates the polygon mirror 521 around the shaft 522.

While the polygon motor rotates the polygon mirror 521 at a constant angular velocity, the polygon mirror 521 is irradiated by the light source 510 with the laser beam LL from the cylindrical lens 514 through the transparent window 545 of the partition wall 543 or 544 and the transparent window 527 of the upper cover 525 of the deflector 520. The incident beam LL is focused by the cylindrical lens 514 on a facet of the polygon mirror 521 in the direction normal to the board surface of the base plate 501, and kept in a parallel beam in the direction parallel to the board surface. This incident beam LL is reflected and deflected by the polygon mirror 521. The reflected beam RL travels through the window 527 of the upper cover 525 of the deflector 520 and the window 545 of the partition wall 543 or 544 to the scanning optical system 531-535. The rotation of the polygon mirror 521 continuously changes inclination of a facet of the mirror from the direction of the incident beam LL, and thus, continuously reduces the angle between the incident beam LL to the polygon mirror 521 and the reflected beam RL from the mirror, i.e. the deflection angle $\varphi$ from its maximum $\varphi_R$ to its minimum $\varphi_L$. When the facet reflecting the incident beam LL is switched to the next facet, the deflection angle $\varphi$ instantaneously returns from the minimum $\varphi_L$ to the maximum $\varphi_R$. Such changes in deflection angle $\varphi$ are periodically repeated during the rotation of the polygon mirror 521.

—Scanning Optical System—

The scanning optical system 531-535, like the emission system 512-514, is a group of optical elements to be exclusively used by one of the light sources 510. The scanning optical system 531-535, in contrast to the emission system 512-514, is disposed also in the lower stage of the housing 500 as well as in the upper stage, and emits the laser beam RL reflected by the polygon mirror 521 from a slit 50C or 50K, which is open to the outside in the lower cover 503 of the housing 500, and focuses the laser beam on a portion of the outer circumferential surface of the photoreceptor drum 24C or 24K, which is exposed through the exposure section 202 of the photoreceptor unit 20C or 20K. In the optical scanning device 25R in FIGS. 2A and 2B, two groups of the scanning optical systems for two of the light sources 510 are disposed symmetrically with respect to the center plane of the board surface of the base plate 501 in the direction of its shorter edges.

The scanning optical system includes an fθ lens 531, first scanning mirror 532, second scanning mirror 533, focusing lens 534, and third scanning mirror 535. The fθ lens 531 and first mirror 532 are disposed in the upper stage of the housing 500; the second mirror 533, focusing lens 534, and third mirror 535 are disposed in the upper stage. The fθ lens 531 allows the reflected beam RL from the polygon mirror 521 to penetrate to the first mirror 532. The first mirror 532, second mirror 533, and third mirror 534 are all elongated plates with mirror finished surfaces. As shown in FIGS. 2A, 2B, 3A-3C, the longitudinal direction of each of the mirrors 532, 533, 535 is parallel to the longer edges of the base plate 501 of the housing 500, i.e. the main scanning direction. The first mirror 532 reflects the penetrating beam RL from the fθ lens 531 and emits the beam through a slit 505, which is open in the board surface of the base plate 501, to the lower stage of the housing 500. The second mirror 533 reflects this reflected beam to the focusing lens 534, which converts the reflected beam from the second mirror 533 to a converging beam. The third mirror 535 reflects the penetrating beam from the focusing lens 534 and emits the beam through a slit 50C or 50K of the lower cover 503 of the housing 500 to the outside.

The fθ lens 531 is, in general, a compound lens consisting of two or more aspherical lenses (not shown in figures), which cooperates with the focusing lens 534 to focus the reflected beam RL from the polygon mirror 531 on the surface of the photoreceptor drum 24C or 24K. The rotation of the polygon mirror 531 changes the deflection angle, and accordingly, moves the penetrating beam TL from the fθ lens 531 on the scanning mirrors 532, 533, and 535 in their respective longitudinal directions. As a result, the spot of the beam TL travels on the surface of the photoreceptor drum 24C or 24K in its axial direction, i.e. the main scanning direction. The fθ lens 531 enables the penetrating beam TL to produce an image height, i.e. a distance of the spot from the light axis, in proportion to the incident angle of the incident beam LL. This characteristic of the fθ lens 531 makes change of the deflection angle φ be in proportion to the travel distance of the spot of the penetrating beam TL. More concretely, as shown in FIG. 3A, the polygon mirror 521 reduces the deflection angle φ by a change amount Δφ from the maximum $φ_R$, and accordingly, the penetrating beam TL from the fθ lens 531 travels a distance Δρ on the first scanning mirror 533. This distance Δρ is in proportion to the change amount Δφ of the deflection angle φ. The distance Δρ is in proportion to the travel distance of the spot on the surface of the photoreceptor drum 24C or 24K, and the change amount Δφ of the deflection angle φ is twice as large as the change θ of the rotation angle of the polygon mirror 521: Δφ=2θ. Accordingly, linearity is established between the location of the spot in the main scanning direction and the rotation angle of the polygon mirror 521. Especially when the polygon mirror 521 rotates at a constant angular velocity, the spot moves at a constant velocity in the main scanning direction during a continuous reduction of the deflection angle φ from the maximum $φ_R$ to the minimum $φ_L$.

Structure of Duct

Figure 5A:
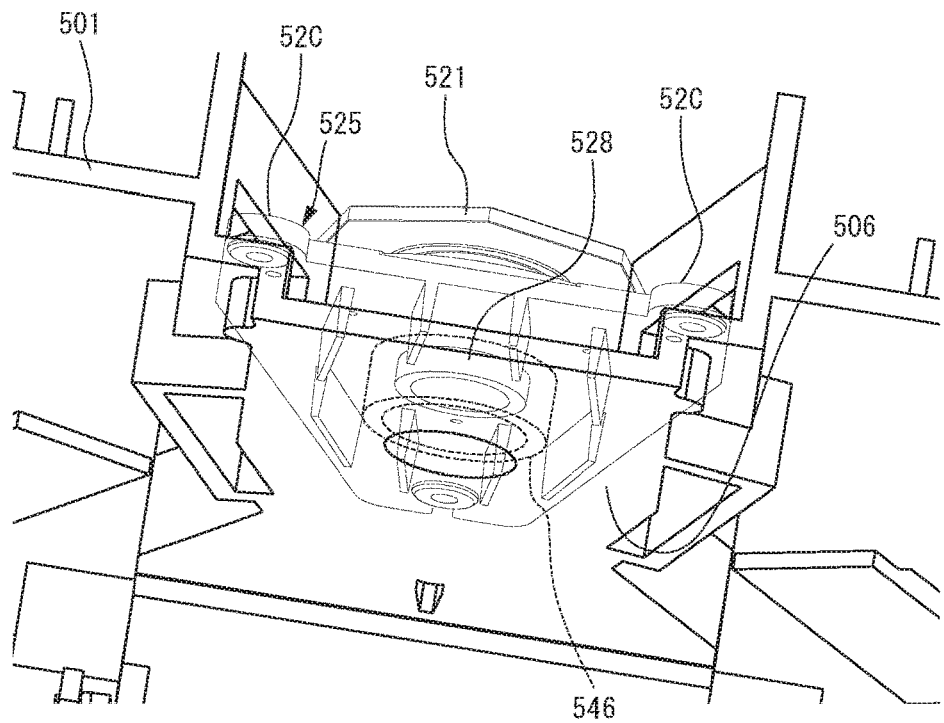
FIGS. 5A and 5B are perspective views of appearances of the center portion of the duct in FIG. 2A visible from different viewpoints.
Figure 5B:
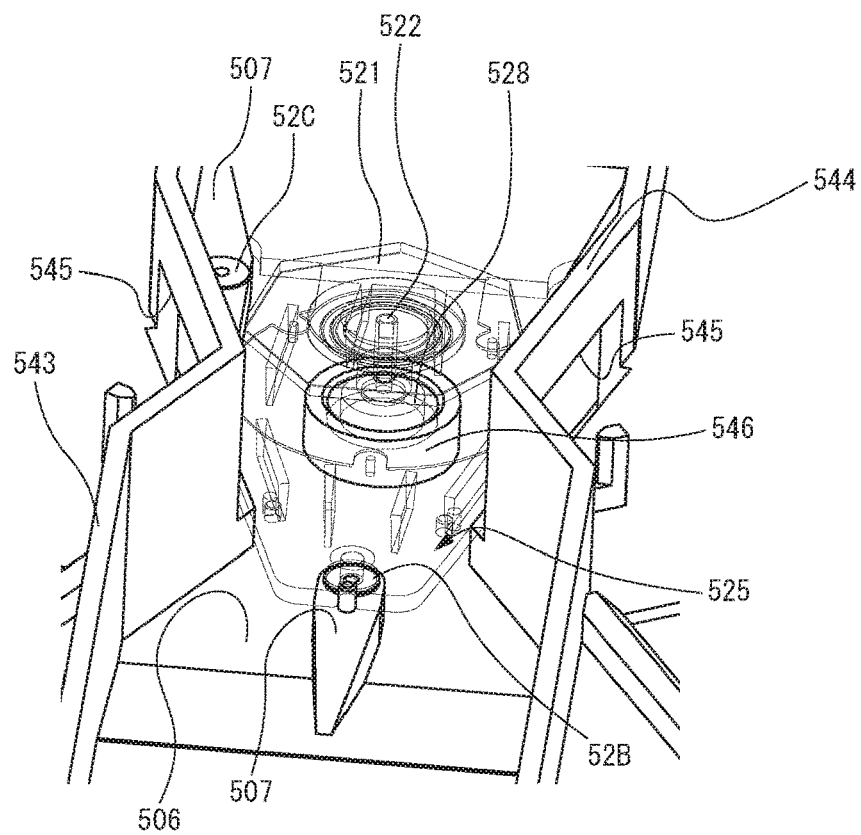

FIGS. 5A and 5B are perspective views of appearances of the center portion of the duct 540 visible from different viewpoints. FIG. 5A shows the base plate 501 as if it were transparent, and through it, the bottom plate 525 of the deflector 520 could be seen. Conversely, FIG. 5B shows the deflector 520 as if it were transparent, and through it, the base plate 501 could be seen. FIGS. 6A and 6B are vertical and horizontal cross-sectional views of the center portion along the lines VIa-VIa and c-c in FIG. 3A, respectively.

—Floor—

In the center portion of the duct 540, the base plate 501 includes a floor 506 and a fixing member 507. The floor 506 is, as shown in FIGS. 6A and 6B, a portion of the base plate 501 that is concave in a direction away from the bottom plate 525 of the deflector 520, and faces the bottom plate 525 across a clearance, in which an air flow path from the inlet 541 to outlet 542 is formed. See trajectories of flows GFL in FIG. 6A. The fixing member 507 is, as shown in FIGS. 5A, 5B, 6A, and 6B, a step raised from the floor 506 to the inside of the duct 540. The fixing member 507 is formed together the base plate 501. The top portion of the fixing member 507 is separated from any inner surface of the duct 540 as well as the floor 506. To the top portion, the bottom plate 525 of the deflector 520 is screwed at its edge 52B near the upper base of the trapezoid and its corners 52C near either end of the lower base of the trapezoid.

—Positioning Member for Deflector—

The center portion of the duct 540 further includes a positioning member 546, which is a pillar protruding from the floor 506 towards the bottom plate 525 of the deflector 520. For example in FIGS. 5A and 5B, the positioning member 546 is a circular tube with an axis parallel to the protruding direction, and formed together with the base plate 501.

The center axis of the positioning member 546 is provided to indicate a position at which the proper rotation axis of the polygon mirror 521, i.e. the center axis of the shaft 522, should be located relative to the optical systems 512-514 and 531-535. The fixing member 546 further has an open tip and a base end closed by the floor 506. This open tip is coupled to a sleeve 528 of the bottom plate 525, which is a ring-shaped protrusion extending outward from the base plate 525 and coaxially with the shaft 522. The positioning member 546 has an inner radius larger than the outer radius of the sleeve 528 by a difference smaller than an allowance between the screwed portions 52B, 52C of the bottom plate 525 and the base plate 501. Accordingly, by allowing the tip to be coupled to the sleeve 528, the positioning member 546 is located on the line extended from the shaft 522 to position the shaft 522 relative to the optical systems 512-535 with a high degree of precision, thus preventing the shaft 522 from excessive inclination caused by external vibration and shock.

—Positioning Member for Deflector—

Since the positioning member 546 is longer than the sleeve 528, the distance of the base plate 525 from the floor 506 is limited to the length of the positioning member 546. In addition, the positioning member 546 has an outer radius sufficiently smaller than the distance between the partition walls 543, 544, and thus, an air flow path is secured in the clearance between the bottom plate 525 and the floor 506 regardless of the installation of the positioning member 546. In particular, this flow path is designed to have a cross-sectional area Slw (cf. FIG. 6B) that is sufficient to prevent any air flow from transmitting a substantial amount of heat generated by the polygon motor and its driver circuit from the outer surface of the bottom plate 525 and positioning member 546 to the floor 506.

As shown in FIGS. 6A and 6B, any portion of the inner surface of the duct 540, like the floor 506, is located at a distance from the outer surface of the body of the deflector 520, and accordingly, an air flow path from the inlet 541 towards the outlet 542 is formed in any clearance between the duct 540 and deflector 520. See trajectories of air flows GFL in FIG. 6A. Thus, most of heat generated by the polygon motor and its driver circuit is dissipated from the entirety of the outer surface of the body of the deflector 520 and positioning member 546, and only a limited fraction of the heat is transferred directly to the base plate 501 through its screwed portions 52B, 52C and the positioning member 546.

As shown in FIGS. 5A and 5B, the distance between the partition walls 543, 544 is narrower at the upstream end of the floor 506 than at portions near the air inlet 541, and increases with downstream distance from the upstream end of the floor 506. This change in distance between the partition walls corresponds to the change in distance between legs of the trapezoid-shaped base plate 525 of the deflector 520. Accordingly, when the deflector 520 is disposed such that the upper base 52B of the trapezoid-shaped base plate 525 is located at the position where the distance between the partition walls has a minimum value as shown in FIGS. 2A and 3A, the clearance between the inner surface of the duct 540 and the outer surface of the body of the deflector 520 has a maximum value at a position where the floor 506 faces the bottom plate 525, and a minimum value at positions where each of the partition walls 543, 544 faces a side wall of the upper shell 526. Thus, most of air flows from the inlet 541 approach clearances between the floor 506 and the bottom plate 525 and between the upper cover 502 and the upper shell 526, and only a small fraction of the air flows turns off to the clearances between the partition walls 543, 544 and the side walls of the upper shell 526.

Preferably as shown in FIG. 6B, the cross-sectional area Slw of an air flow path secured in the clearance between the floor 506 and the base plate 525 is larger than the cross-sectional area Sup of an air flow path secured in the clearance between the upper cover 502 and an opposite side of the upper shell 526 with respect to the base plate 525. This entails a larger amount of an air flow per unit time in the clearance between the floor 506 and the base plate 525 than in the clearance between the upper cover 502 and the upper shell 526. Since the base plate 525 is nearer to the polygon motor than the upper shell 526, a larger amount of heat dissipated from the deflector 520 to the inside of the duct 540 passes through the base plate 525 than through the upper shell 526. Thus, the cross-sectional area Slw of the air flow path facing the base plate 525 larger than the cross-sectional area Sup of the air flow path facing the upper shell 526 enables the duct 540 to improve the high efficiency of heat dissipation from the deflector 520.

—Heat Dissipater of Deflector—

Figure 7A:
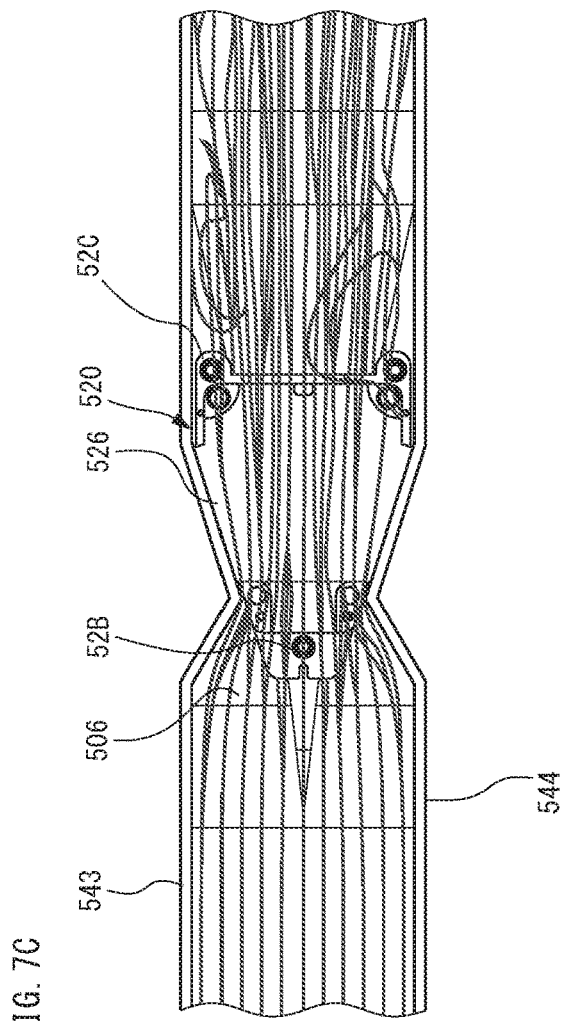
FIGS. 7A and 7B are front and top views of the deflector, respectively.
Figure 7C:
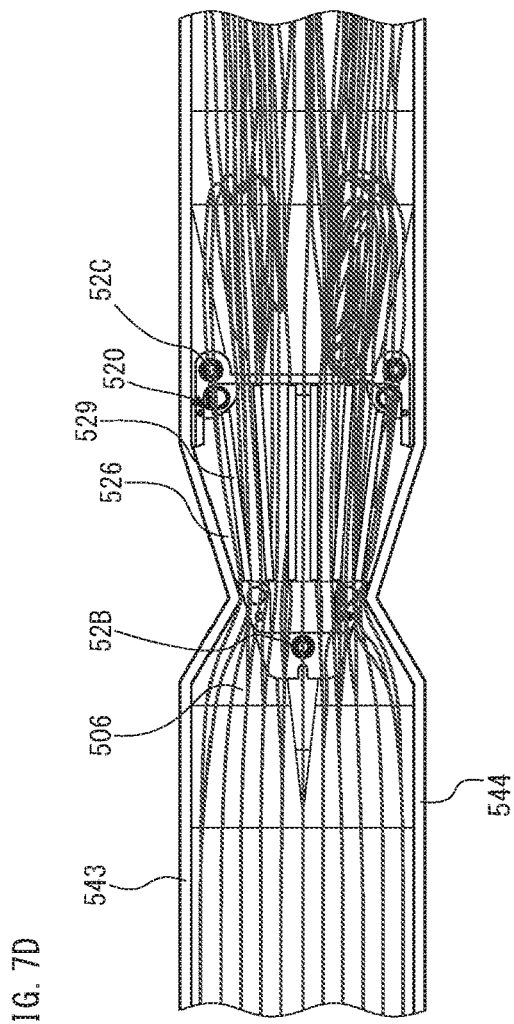
FIGS. 7C and 7D are schematic views of trajectories of air flows.
Figure 7B:
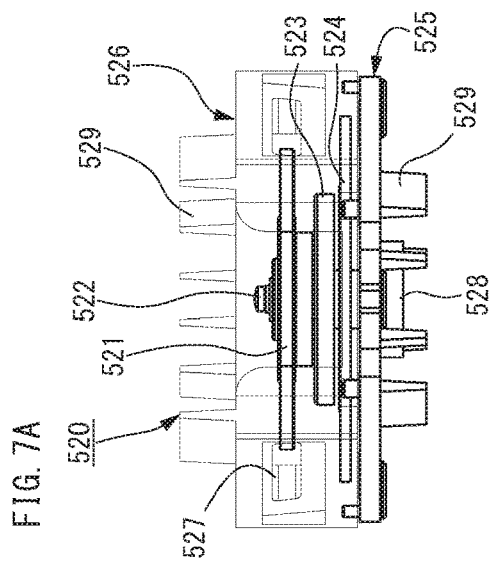

FIGS. 7A and 7B are front and top views of the deflector 520, respectively, which show the upper shell 526 of the deflector 520 as if it were transparent and its inner structure were visible from the outside. As shown in these figures, both the base plate 525 and upper shell 526 of the deflector 520 include heat dissipaters on their respective outer surfaces. The heat dissipaters each include two or more convex plates 529, which increase the substantial surface areas of the base plate 525 and upper shell 526, thus increasing amounts of heat dissipated per unit time from them.

Figure 7D:
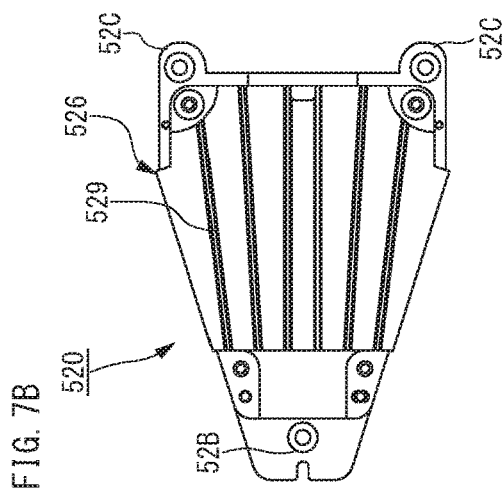

FIGS. 7C and 7D are schematic views of trajectories of air flows when the heat dissipater 529 is removed from the upper shell 526 of the deflector 520 and when the heat dissipater 529 is mounted on the upper shell 526, respectively. Preferably as shown in these figures, the convex plates of the heat dissipater 529 are each designed in shape such that their board surfaces 525 extend along the trajectories of air flows when the heat dissipater 529 is removed from the body of the deflector 520. This prevents any substantial deviation of the shape of the flow trajectories, at least around the body of the deflector 520, regardless of the presence or absence of the heat dissipater 529 as shown in FIGS. 7C and 7D. The flow trajectories with substantially the same shape regardless of the presence or absence of the heat dissipater 529 mean a low drag of the heat dissipater 529 on the air flows, which results in optimization in electric power consumption of the fans blowing air into the duct 540.

The heat dissipater 529 preferably has a larger surface area on the upper shell 526 than on the bottom plate 525, as shown in FIGS. 4A, 4B, and 6B. This causes a higher drag of the heat dissipater 529 on air flows around the upper shell 526 than around the bottom plate 525, which results in the flow velocity Vlw in the clearance between the floor 506 and the base plate 525 being higher than the flow velocity Vup in the clearance between the upper cover 502 and the upper shell 526, and thus the flow amount per unit time is larger in the former clearance than in the latter clearance. Accordingly, the duct 540 has a higher efficiency of heat dissipation from the deflector 520.

Merit of Embodiment

In the optical scanning device 25R according to the embodiment of the invention, as described above, the duct 540 surrounds the space from the deflector 520 and its circumference to the outlet 542 in insulation from the optical systems 512-535, and guides air flows from the inlet 541 through the space to the outlet 542. Thus, the air flows in the duct 540 without touching any of the optical elements 512-535. In the duct 540, the positioning member 546 protrudes from the floor 506 and limits the clearance between the bottom plate 525 of the deflector 520 and the floor 506 to secure therein the air flow path. Accordingly, most of heat generated by the polygon motor and its driver circuit is drawn by the air flows in the duct 540 and dissipated from the outlet 542 to the outside of the housing 500 without leaking from the duct 540 to any other spaces in the upper stage of the housing. Thus, the efficiency of heat dissipation from the deflector 520 is maintained at a higher degree. In particular, even when an increasing rotation speed of the polygon mirror 521 increases an amount of heat generated by the polygon motor and its driver circuit, the optical scanning device 25R can prevent the base plate 501 of the housing 500 and the optical systems 512-535 from distortion caused by excessive heat.

In addition, the center axis of the positioning member 546 indicates a position at which the proper rotation axis of the polygon mirror 521, i.e. (the center axis of) the shaft 522, should be located relative to the optical systems 512-535. The tip of the positioning member 546 coupled to the sleeve 528 of the bottom plate 525 of the deflector 520 positions the shaft 522 relative to the optical systems 512-535 with a high degree of precision, thus preventing the shaft 522 from excessive inclination relative to the base plate 501 of the housing 500 caused by external vibration and shock. Therefore, the optical scanning device 25R can maintain a high degree of positioning accuracy for the rotation axis of the polygon mirror 521 regardless of increase in rotation speed of the polygon mirror 521.

Modification (A) The image forming device 100 in FIGS. 1A-1C is a color laser printer. Alternatively, an image forming device according to an embodiment of the invention may be a monochrome laser printer, an inkjet printer, a fax machine, a copier, or a multifunction peripheral (MFP).

(B) The light source 510 in FIGS. 2A, 2B, and 3A-3C includes the semiconductor laser 511. Alternatively, the light source may include a light-emitting diode (LED) instead of the semiconductor laser. The structure of the polygon mirror 521 and the configuration of the optical system such as the fθ lens 531 in FIGS. 2A, 2B, and 3A-3C are merely one example, and another structure or configuration may be applicable. For example, the polygon mirror may have a number of facets other than seven. The emission optical system 512-514 or the scanning optical system 531-535 may have a configuration in which the same group of optical elements is to be used in exposure and scanning of two or more photoreceptor drums instead of the configuration in which each group of optical elements is to be exclusively used by one of the photoreceptor drums 24Y-24K.

(C) The polygon motor in FIGS. 4C and 4D has the structure with fixed shaft, in which the polygon mirror 521 includes the bearing and the shaft 522 is fixed to the bottom plate 525. Alternatively, the polygon motor may have a structure with rotatable shaft, i.e. the body of the deflector may include a bearing and the shaft may be coaxially fixed to the polygon mirror and rotatable with the polygon mirror.

(D) The positioning member 546 in FIGS. 5A and 5B is shaped as the sleeve with the open tip and the base end closed by the floor 506. In addition to including such a hollow structure, the positioning member 546 allows air flows to remove heat from its outer circumferential surface so that a tiny amount of heat can travel from the bottom plate 525 through the positioning member 546 to the floor 506. In order to further reduce the heat amount, the positioning member may be designed to have an additional structure described below.

Figure 8A:
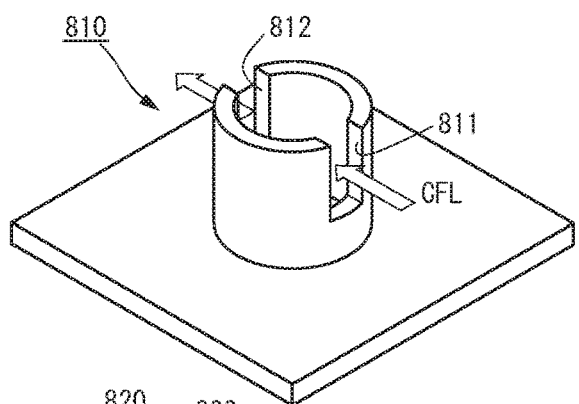
FIG. 8A is a perspective view of a first modification of the positioning member.

FIG. 8A is a perspective view of a first modification 810 of the positioning member. This positioning member 810 includes axial notches 811, 812 in the outer circumferential surface: one 811 located upstream of the duct 540 and another 812 downstream of it. The air flow enters the upstream notch 811, travels inside the positioning member 810, and escapes from the downstream notch 812. Thus, heat transmitting from the bottom plate 525 through the positioning member 810 towards the floor 506 is drawn by not only the air flow touching the outer circumferential surface, but also the air flow CFL passing through the notches 811, 812. Therefore, heat that can reach the floor 506 is further reduced.

Figure 8B:
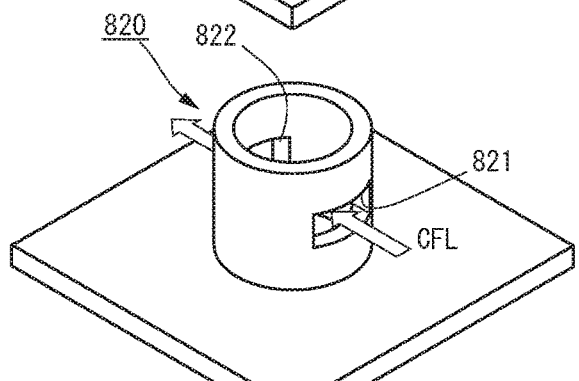
FIG. 8B is a perspective view of a second modification of the positioning member.

FIG. 8B is a perspective view of a second modification 820 of the positioning member. This positioning member 820 includes through holes 821, 822 in the outer circumferential surface: one 821 located upstream of the duct 540 and another 822 downstream of it. The air flow enters the upstream hole 821, travels inside the positioning member 820, and escapes from the downstream hole 822. Thus, heat transmitting from the bottom plate 525 through the positioning member 820 towards the floor 506 is drawn by not only the air flow touching the outer circumferential surface, but also the air flow CFL passing through the holes 821, 822. Therefore, heat that can reach the floor 506 is further reduced.

Figure 8C:
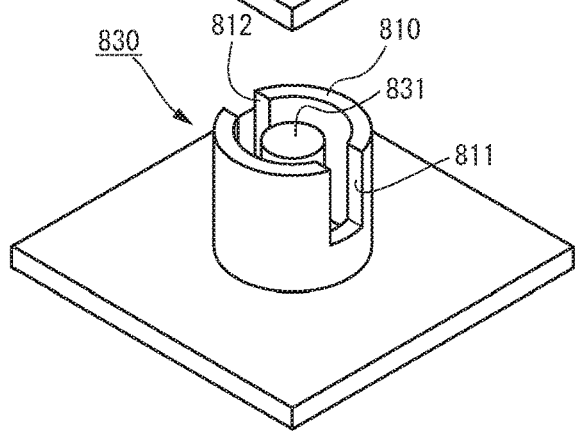
FIG. 8C is a perspective view of a third modification of the positioning member.
Figure 8D:
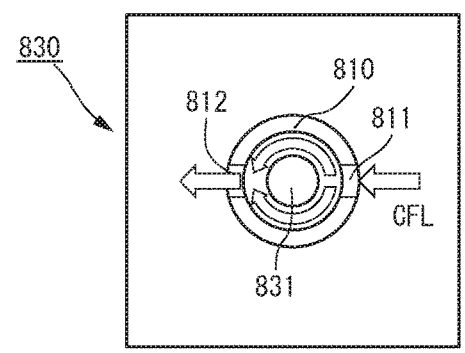
FIG. 8D is a top view of the structure shown in FIG. 8C.

FIG. 8C is a perspective view of a third modification 830 of the positioning member, and FIG. 8D is a top view of the structure shown in FIG. 8C. This positioning member 830, like the member 810 in FIG. 8A, includes axial notches 811, 812 in the outer circumferential surface. This positioning member 830 further includes a pillar 831 inside the sleeve 810; This pillar 831 is a circular pillar with the same axis as the external sleeve 810, an outer radius smaller than the inner radius of the sleeve 810, and a height smaller than the height of the sleeve 810. Accordingly, the air flow entering the upstream notch 811 and traveling inside the positioning member 820, as shown by arrows in FIG. 8D, collides with the pillar 831 to change its direction, travels along the inner circumferential surface of the sleeve 810, and escapes from the downstream notch 812. Thus, this positioning member 830 allows air to flow around the inner circumferential surface at a velocity higher than the sleeve 810 alone in FIG. 8A, and accordingly, enables the air flows CFL passing through the notches 811, 812 to draw a larger amount of heat. Therefore, heat that can transmit from the bottom plate 525 through the positioning member 830 to the floor 506 is further reduced.

The positioning member 546 in FIGS. 5A and 5B is the circular tube with the open tip coupled to the sleeve 528 protruding from the bottom plate 525 of the deflector 520. Instead of this sleeve 528, the bottom plate 525 may include a hole that the base end of the shaft 522 penetrates, and the open tip of the positioning member 546 may be coupled to the base end out of the hole. Alternatively, the bottom plate 525 may include a hole that a tip of the positioning member 546 can penetrate.

(F) The deflector 520 in FIGS. 4A-4D, 7A, and 7B includes the heat dissipater 529 on the upper shell 526, whose convex plates have the board surfaces along the trajectories of air flows when the plates are removed from the upper shell 526, thus having low drag on the air flows. This results in reduction in electric power consumption of the fan blowing the air flows in the duct 540. If the reduction does not actually matter, the structure of the upper shell 526 may be modified to have a higher drag on the air flows than the heat dissipater 529 of the bottom plate 525.

Figure 9:
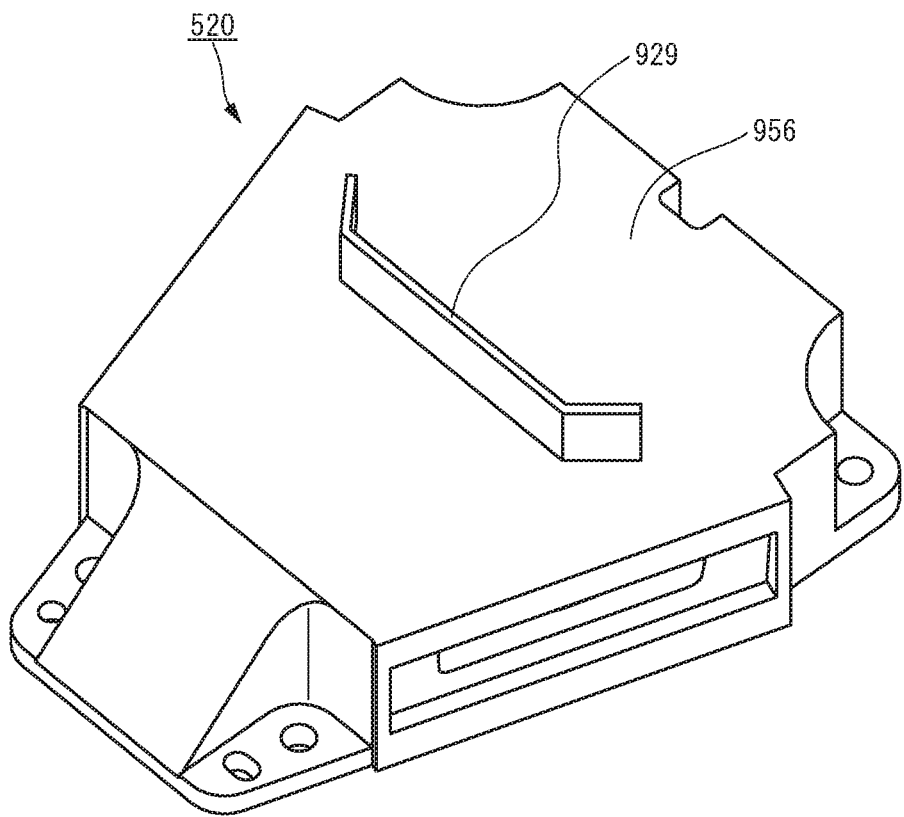
FIG. 9 is a perspective view of a modified upper shell of the body of the deflector.

FIG. 9 is a perspective view of the modified upper shell 956 of the body of the deflector 520. This upper shell 956 includes a barrier instead of the heat dissipater 529. The barrier 929 includes at least one convex plate whose board surface extends in a direction substantially perpendicular to air flows, in contrast to the convex plates of the heat dissipater 529, thus having a significantly higher drag on the air flows than the heat dissipater 529 of the bottom plate 525. The difference in drag causes the flow velocity Vlw in the clearance between the bottom plate 525 and the floor 506 to be substantially higher than the flow velocity Vup in the clearance between the upper shell 526 and the upper cover 502, and accordingly, the flow amount per unit time is further larger in the former clearance than in the latter clearance. Therefore, the duct 540 has a higher efficiency of heat dissipation from the deflector 520.

Supplement

Based on the above-described embodiment, the invention may be further characterized as follows.

The body of the deflector may include a protrusion at a portion contact with the tip of the positioning member. The tip of the positioning member may include a coupler for the protrusion. The deflector may further include a fixed axis supporting the polygon mirror, around which the polygon mirror is rotatable. The body of the deflector may include a hole allowing an end of the fixed axis to penetrate, and the tip of the positioning member may include a coupler for the end of the fixed axis. The positioning member may be shaped as a sleeve, wherein the coupler is an open tip of the sleeve. An outer circumferential surface of the positioning member may include an axial notch. The notch may be located upstream of the outer circumferential surface of the positioning member in the duct, and another notch may be located downstream of the outer circumferential surface. An outer circumferential surface of the positioning member may include a through hole. The through hole may be located upstream of the outer circumferential surface of the positioning member in the duct, and another through hole may be located downstream of the outer circumferential surface. The positioning member may include a pillar inside the sleeve. The body of the deflector may include a hole to couple to the tip of the positioning member. The positioning member may be located on a line extended from the rotation axis of the polygon mirror.

The outer surface of the body of the deflector may further include a heat dissipater. The heat dissipater may be located at an outer surface of the supporting section or an opposite side of the outer surface of the body of the deflector with respect to the supporting section. The heat dissipater may include two or more convex plates. The convex plates may be aligned along trajectories of gas flows around the body of the deflector if the convex plates are removed from the body.

The duct may further include a pair of walls extending in a direction normal to the floor. The distance between the pair of walls may be narrower at an upstream end of the floor than at a portion near the inlet, and may increase with downstream distance from the upstream end of the floor.

The flow path of the gas between the floor of the duct and an outer surface of the supporting section of the body of the deflector may have a cross-sectional area larger than the flow path of the gas between an inner surface of the duct and an opposite outer surface of the body of the deflector with respect to the supporting section.

The opposite outer surface of the body of the deflector with respect to the supporting section may include a barrier reducing a flow velocity in the duct, and a flow velocity between an outer surface of the supporting section and an inner surface of the duct may be higher than a flow velocity between the opposite outer surface and an inner surface of the duct.

The housing may further include a base plate partitioning an inner space of the housing and having a face supporting optical elements included in the optical system. The base plate may include a fixing member fixing the body of the deflector at a distance from any inner surface of the duct. The floor of the duct may be located at a portion of the base plate facing inside of the duct.

Although one or more embodiments of the present invention have been described and illustrated in detail, the disclosed embodiments are made for the purposes of illustration and example only and not limitation. The scope of the present invention should be interpreted by the terms of the appended claims.

What is claimed is:

1. An optical scanning device for scanning a target surface with light, comprising:
    a light source;
    a deflector including a polygon mirror that, while rotating, reflects a beam from the light source to deflect the beam, a motor rotating the polygon mirror, and a body containing the polygon mirror and the motor, the body including a supporting section supporting the motor;
    an optical system focusing a beam reflected from the polygon mirror on the target surface; and
    a housing containing the light source, the deflector, and the optical system, including:
        an inlet allowing external air to enter the housing;
        an outlet allowing internal air to flow out of the housing; and
        a duct surrounding a space from the deflector and its circumference to the outlet in insulation from the optical system, and guiding gas from the inlet to the space, the duct having:
            a floor facing to an outer surface of the supporting section of the body of the deflector; and
            a positioning member shaped as a pillar that protrudes from the floor towards the deflector and has a tip to contact with the deflector to locate the rotation axis of the polygon mirror at a position relative to the housing, and to limit a clearance between the supporting section and the floor to secure therein a flow path of the gas from the inlet,
        wherein the body includes an upper portion, the polygon mirror is between the supporting section and the upper portion, and the duct guides the gas from the inlet across an outer surface of the upper portion.

2. The optical scanning device according to claim 1, wherein
    the deflector further includes a fixed axis supporting the polygon mirror, around which the polygon mirror is rotatable,
    the body of the deflector includes a hole allowing an end of the fixed axis to penetrate, and
    the tip of the positioning member includes a coupler for the end of the fixed axis.

3. The optical scanning device according to claim 1, wherein the body of the deflector includes a hole to couple to the tip of the positioning member.

4. The optical scanning device according to claim 1, wherein the positioning member is located on a line extended from the rotation axis of the polygon mirror.

5. The optical scanning device according to claim 1, wherein an outer surface of the body of the deflector includes a heat dissipater.

6. The optical scanning device according to claim 5, wherein the heat dissipater is located at an outer surface of the supporting section.

7. The optical scanning device according to claim 5, wherein the heat dissipater is located at an opposite side of the outer surface of the body of the deflector with respect to the supporting section.

8. The optical scanning device according to claim 5, wherein the heat dissipater includes two or more convex plates.

9. The optical scanning device according to claim 8, wherein the convex plates are aligned along trajectories of gas flows around the body of the deflector if the convex plates are removed from the body.

10. The optical scanning device according to claim 1, wherein
    the duct further includes a pair of walls extending in a direction normal to the floor, and
    a distance between the pair of walls is narrower at an upstream end of the floor than at a portion near the inlet, and increases with downstream distance from the upstream end of the floor.

11. The optical scanning device according to claim 1, wherein a flow path of the gas between the floor of the duct and an outer surface of the supporting section of the body of the deflector has a cross-sectional area larger than a flow path of the gas between an inner surface of the duct and an opposite outer surface of the body of the deflector with respect to the supporting section.

12. The optical scanning device according to claim 1, wherein
    an opposite outer surface of the body of the deflector with respect to the supporting section includes a barrier reducing a flow velocity in the duct, and
    a flow velocity between an outer surface of the supporting section and an inner surface of the duct is higher than a flow velocity between the opposite outer surface and an inner surface of the duct.

13. The optical scanning device according to claim 1, wherein the housing further includes a base plate partitioning an inner space of the housing and having a face supporting optical elements included in the optical system, the base plate includes a fixing member fixing the body of the deflector at a distance from any inner surface of the duct, and the floor of the duct is located at a portion of the base plate facing inside of the duct.

14. An optical scanning device for scanning a target surface with light, comprising:

a light source;

a deflector including a polygon mirror that, while rotating, reflects a beam from the light source to deflect the beam, a motor rotating the polygon mirror, and a body containing the polygon mirror and the motor, the body including a supporting section supporting the motor;

an optical system focusing a beam reflected from the polygon mirror on the target surface; and a housing containing the light source, the deflector, and the optical system, including:

an inlet allowing external air to enter the housing;

an outlet allowing internal air to flow out of the housing; and a duct surrounding a space from the deflector and its circumference to the outlet in insulation from the optical system, and guiding gas from the inlet to the space, the duct having:

a floor facing to an outer surface of the supporting section of the body of the deflector; and a positioning member shaped as a pillar that protrudes from the floor towards the deflector and has a tip to contact with the deflector to locate the rotation axis of the polygon mirror at a position relative to the housing, and to limit a clearance between the supporting section and the floor to secure therein a flow path of the gas from the inlet, wherein the body of the deflector includes a protrusion at a portion in contact with the tip of the positioning member, and the tip of the positioning member includes a coupler for the protrusion.

15. The optical scanning device according to claim 14, wherein the positioning member is shaped as a sleeve, and the coupler is an open tip of the sleeve.

16. The optical scanning device according to claim 15, wherein an outer circumferential surface of the positioning member includes an axial notch.

17. The optical scanning device according to claim 16, wherein the notch is located upstream of the outer circumferential surface of the positioning member in the duct, and another axial notch is located downstream of the outer circumferential surface.

18. The optical scanning device according to claim 15, wherein an outer circumferential surface of the positioning member includes a through hole.

19. The optical scanning device according to claim 18, wherein the through hole is located upstream of the outer circumferential surface of the positioning member in the duct, and another through hole is located downstream of the outer circumferential surface.

20. The optical scanning device according to claim 15, wherein the positioning member includes a pillar inside the sleeve.

21. An image forming apparatus comprising:

an imaging unit forming a toner image on a sheet; and a fuser unit thermally fixing the toner image, the imaging unit including:

a photoreceptor varying an amount of charge with an amount of exposure;

an optical scanning device exposing the photoreceptor to a light beam and forming an electrostatic latent image on the photoreceptor;

a developer converting the latent image to a visible image with toner; and a transfer device transferring the visible image converted by the developer from the photoreceptor to a sheet, the optical scanning device including:

a light source;

a deflector including a polygon mirror that, while rotating, reflects a beam from the light source to deflect the beam, a motor rotating the polygon mirror, and a body containing the polygon mirror and the motor, the body including a supporting section supporting the motor;

an optical system focusing a beam reflected from the polygon mirror on the target surface; and a housing containing the light source, the deflector, and the optical system, including:

an inlet allowing external air to enter the housing;

an outlet allowing internal air to flow out of the housing; and a duct surrounding a space from the deflector and its circumference to the outlet in insulation from the optical system, and guiding gas from the inlet to the space, the duct having:

a floor facing to an outer surface of the supporting section of the body of the deflector; and a positioning member shaped as a pillar that protrudes from the floor towards the deflector and has a tip to contact with the deflector to locate the rotation axis of the polygon mirror at a position relative to the housing, and to limit a clearance between the supporting section and the floor to secure therein a flow path of the gas from the inlet, wherein the body includes an upper portion, the polygon mirror is between the supporting section and the upper portion, and the duct guides the gas from the inlet across an outer surface of the upper portion.

\* \* \* \* \*